United States Patent [19]

White

[11] 4,315,319
[45] Feb. 9, 1982

[54] NON-LINEAR SIGNAL PROCESSOR

[75] Inventor: Stanley A. White, Santa Ana, Calif.

[73] Assignee: Rockwell International Corporation, El Segundo, Calif.

[21] Appl. No.: 117,502

[22] Filed: Feb. 1, 1980

[51] Int. Cl.³ ............................................. G06F 15/36
[52] U.S. Cl. .................................. 364/571; 179/1 P; 364/553; 375/12; 455/63
[58] Field of Search ............... 364/513, 553, 571, 572, 364/574, 724; 179/1 P; 375/11, 12, 14; 455/63, 296, 307

[56] References Cited

U.S. PATENT DOCUMENTS

| | | | |
|---|---|---|---|
| 3,925,646 | 12/1975 | Richardson et al. | 364/724 |
| 4,067,060 | 1/1978 | Poussart et al. | 364/553 |
| 4,141,072 | 2/1979 | Perreault | 375/12 X |
| 4,225,832 | 9/1980 | Faye | 375/14 X |
| 4,227,046 | 10/1980 | Nakajima et al. | 179/1 P X |

*Primary Examiner*—Jerry Smith
*Attorney, Agent, or Firm*—H. Fredrick Hamann; Rolf M. Pitts

[57] ABSTRACT

A device for the correction of signal distortion occurring in a signalling channel. Compensatory amplitude adjustment is made to a sampled signal in accordance with the statistical deviation of the signal from a preselected statistical model. Signal sampling means employs the sampled signal as a write-address for generating a statistical amplitude distribution function. Inverse distribution function means, responsive to addressing by the distribution function, provides an output signal of compensatorily modified amplitude.

14 Claims, 11 Drawing Figures

NON-LINEAR SIGNAL PROCESSOR

BACKGROUND OF THE INVENTION

The concept of the invention relates to means for improving the quality of a signal, such as human speech, transmitted through a medium which causes non-linear distortion (i.e., a non-linear medium).

In the prior art of voice signal processing to overcome distortion due to the signalling medium, a variety of techniques have been employed. In the case of a frequency distorting signalling medium of known, fixed properties, the technique of the inverse filter has been used, whereby a network having a transfer function which is the inverse of the transfer function for the signalling medium (i.e., telephone line or whatever), is employed. In this way the a priori frequency distorted signal is re-distorted or compensatorily reshaped to its original waveform or shape. Such a technique is of limited effectiveness, however, under those circumstances where the properties of the signalling channel are unpredictable or variable. In such alternative case, the prior art has employed adaptive linear filter techniques. The most successful of these appear to be digital techniques applied to digitized data. Such digital techniques have been applied to overcoming linear distortions in a transmission line and for compensation of deviations from a linear response (described by a classical linear differential equation or difference equation whose coefficients are not functions of the amplitude of the input signal). Examples of such adaptive linear compensation techniques are disclosed in U.S. Pat. No. 3,524,169 to Gerald K. McAuliffe et al for IMPULSE RESPONSE CORRECTION SYSTEM, U.S. Pat. No. 3,573,624 to Jon P. Hartmann et al for IMPULSE RESPONSE CORRECTION SYSTEM and U.S. Pat. No. 3,614,623 to Gerald K. McAuliffe for ADAPTIVE SYSTEM FOR CORRECTION OF DISTORTION OF SIGNALS IN TRANSMISSION OF DIGITAL DATA.

Such digital adaptive filter or correlation techniques have also been useful in the extraction of noise lying within the signal spectrum of a noisy signal. Examples of correlation techniques for spectral equalization of electrical speech signals are taught in U.S. Pat. No. 4,000,369 to James E. Paul, Jr. for ANALOG SIGNAL CHANNEL EQUALIZATION WITH SIGNAL-IN-NOISE EMBODIMENT, and U.S. Pat. No. 4,052,559 to James E. Paul, et al for NOISE FILTERING DEVICE.

However, a limitation of such prior art techniques is the ineffectiveness of the device in correcting signals which have been subjected to a non-linear distorting process such as, for example, soft saturation.

SUMMARY OF THE INVENTION

By means of the concept of the present invention, the above-noted limitation of the prior art is avoided, and improved distortion-correcting means is provided which does not require a priori knowledge of or a reliable model for the non-linearities of the signalling channel.

In a preferred embodiment of the invention, a model of the signalling channel transfer function is not used. Instead, a statistical model of the signal-to-be-transported is employed, and compensatory adjustment is made to the amplitude of a sampled, received signal in accordance with the statistical deviation thereof from the preselected statistical model. Signal sampling means, adapted to be responsive to an applied signal input (x) as a write-address, is provided for generating a statistical amplitude distribution function $D(x)$. Inverse distribution function means, responsive to addressing by the distribution function output of the signal sampling means, provides an output signal corresponding to a compensatorily modified amplitude of the applied signal input (x), thereby correcting signal distortion occurring in the signalling channel.

Accordingly, novel signal modulating means is provided for overcoming non-linearities in the signal transport properties of the signalling channel. Also, because such device of the invention does not require accurate modelling of the signalling channel, the response of the device is not overly sensitive to changes in the signal transfer properties of the signalling channel, and the device "learning time" is minimal.

Those and other objects of the invention will become apparent from the following description, taken together with the accompanying drawings in which:

BRIEF DESCRIPTION OF THE DRAWINGS

In the figures, like reference characters refer to like parts.

DESCRIPTION OF THE PREFERRED EMBODIMENTS

Figure 1:
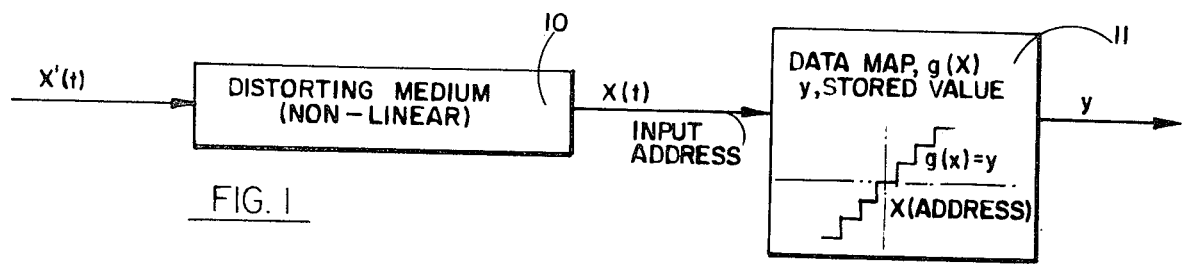
FIG. 1 is a block diagram of a system in which the concept of the invention may be advantageously employed.

Referring now to FIG. 1, there is illustrated in block diagram form a system in which the concept of the invention may be advantageously employed. There is provided a signalling element 10 having non-linear signal transport properties, from which a distorted signal output x(t) occurs in response to an applied input signal x'(t). In accordance with the concept of the invention, there is also provided data mapping means 11 for sampling received signal x to provide a corrected output amplitude y=g(x) in response to addressing the mapped function g(x) by the sampled amplitude x(n). Such mapped function, g(x) versus x, stored in data map 11, is constructed from historical data of the speech signal of interest, and may be updated from statistics of the sampled input signal x(n), as shown more particularly in FIG. 2.

Figure 2:
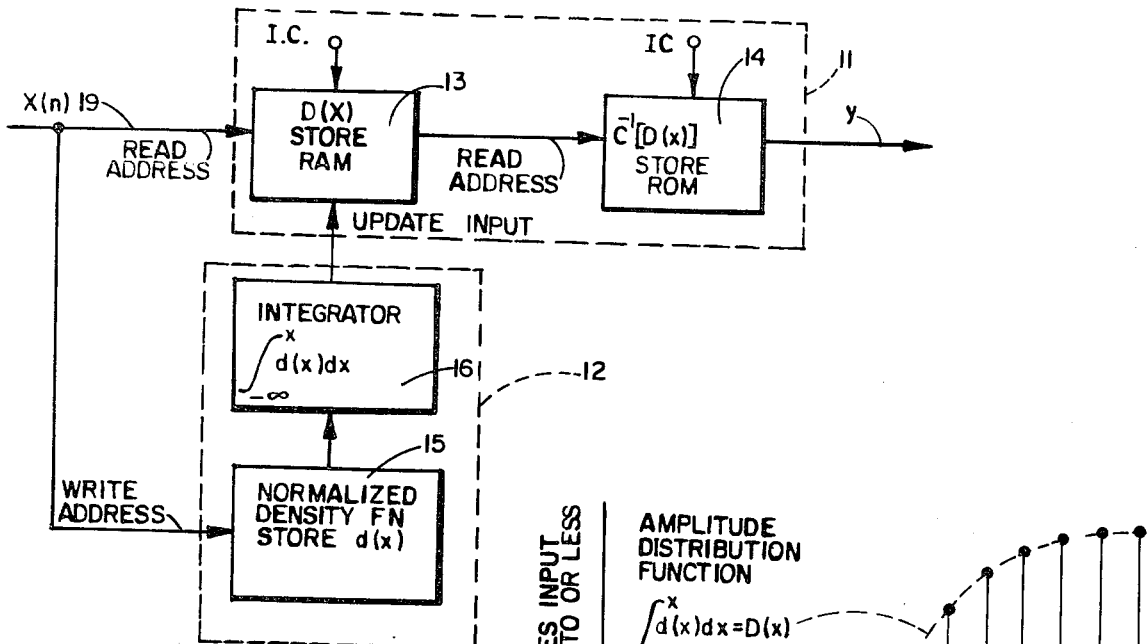
FIG. 2 is a simplified block diagram of one aspect of the inventive concept.
Figure 4:
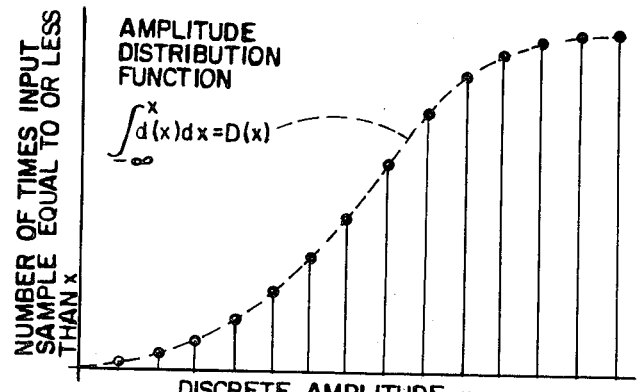
FIG. 4 is a representative amplitude distribution of the histogram of FIG. 3, the data for which is generated and employed by the device of FIG. 2.

Referring now to FIG. 2, there is illustrated in block diagram form an embodiment of the inventive concept, including means 12 for updating the corrective data maps. There is provided a first random access memory (RAM) 13, having a read address responsive to the sampled digital signal x(n), and storing an amplitude distribution function, D(x) versus x, representing the number of times the input sample has an amplitude equal to or less than a given amplitude for x(n), a representative shape of which function is depicted in FIG. 4. The data read-out from RAM 13, occurring in response to being addressed by the amplitude of signal sample x(n), is employed as a read-address by a read-only memory (ROM) 14. ROM 14 stores an inverse function, $C^{-1}[D(x)]$, of a statistically correct amplitude (y) versus an amplitude distribution function address C(·). The statistically correct amplitude y appears as a readout from ROM 14 in respose to the applied read-address D(x). Accordingly, it is to be appreciated that the read output value y from dotted block 11, resulting from the amplitude read-address x(n) represents the mechanization, $g(x)=C^{-1}[D(x)]$.

In the utilization and operation of RAM 13 and ROM 14, the function $C^{-1}(\cdot)$ is loaded into ROM 14 and an initial function D(x) is loaded into RAM 13 via data write in's as initial conditions thereof, such initial conditions being obtained from historical records of the kinds of speech signals (i.e., ethnic and cultural voice and vocabulary of interest). Thus, the cooperation of elements 13 and 14 serve as the data map 11 of FIG. 1 for the function $g(x)=C^{-1}[D(x)]=y$.

Figure 3:
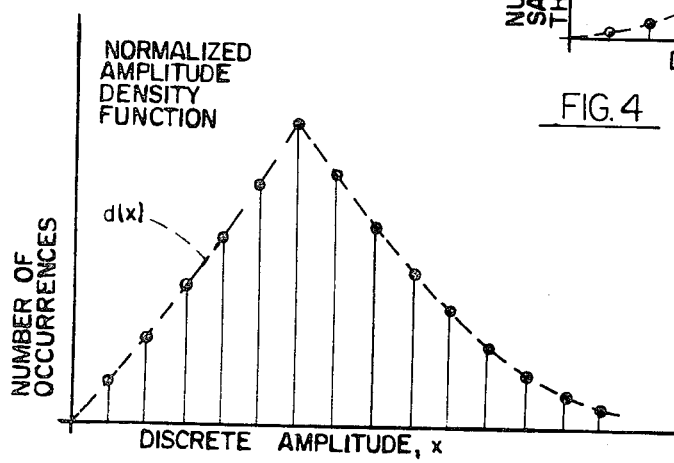
FIG. 3 is a representative histogram of an amplitude density function, the data for which is generated and employed by the device of FIG. 2.

The actual amplitude distribution function D(x) for the sampled signal of interest, x(n), is developed by means of the cooperation of element 12 in FIG. 2 with element 13, the initial condition input to RAM 13 serving merely as an estimated set of conditions for allowing quicker use of the device of FIG. 2 or getting "on-stream" with a useable output sooner. Such means 12 for developing an updated amplitude distribution function D(x) from the actual sampled signal x(n) is comprised of means 15 for generating an amplitude density function d(x) or a histogram of the number of occurrences of each of a discrete amplitude $x_i$. An envelope of a representative one of such histograms is shown in FIG. 3.

The amplitude distribution function D(x), representing the number of times the sampled input has been equal to or less than each discrete value of the amplitude x, is obtained by integrating the function d(x) with respect to the amplitude, x:

$$D(x) = \int_{-\infty}^{x} d(x)dx. \tag{1}$$

Digital integrator 16, responsive to the output of element 15, is employed in the arrangement of FIG. 2 for such purpose, the output thereof being fed to update the data stored in element 13. Accordingly, it is to be appreciated that the curve of D(x) in FIG. 4 represents the integral of the curve d(x) of FIG. 3.

Figure 5A:
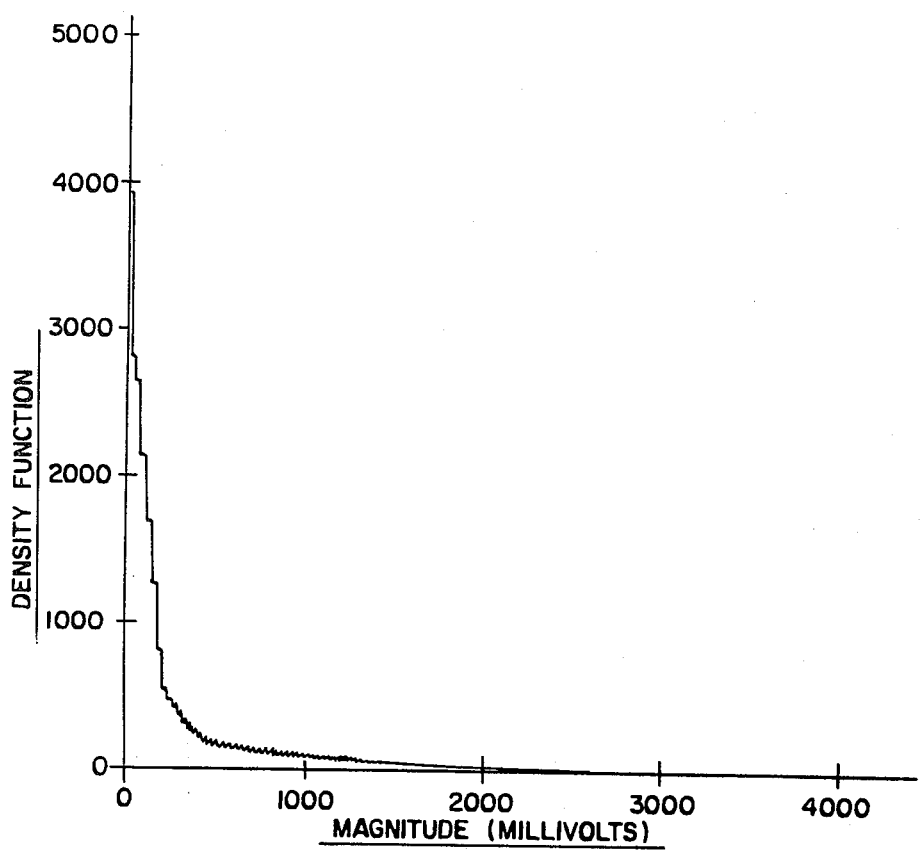
FIGS. 5A and 5B, respectively, illustrate a respective actual amplitude density function versus amplitude and a corresponding logarithm of the density function versus amplitude, demonstrating the detail-emphasizing effect of the log function.
Figure 5B:
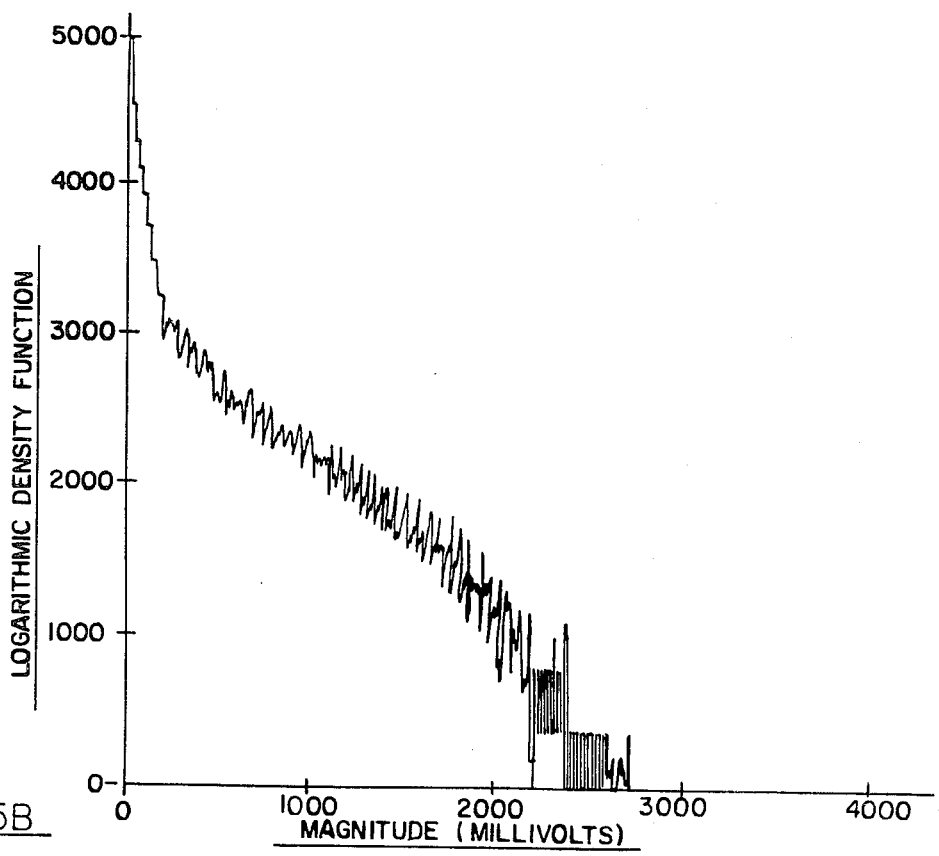

The style of the exemplary histogram shown in FIG. 3 has been depicted for convenience for purposes of exposition in conjunction with the density function of FIG. 4. A more nearly representative histogram of an actual specimen speech sample, illustrated in FIG. 5A, showing the relative lack of detail data therein. FIG. 5B depicts a corresponding logarithm of the density function of FIG. 5A, and demonstrates the superior emphasis of data details provided thereby. In the practical utilization of such logarithmic form, it has been found preferrable not to employ the upper and lower 20% (extremities) of the (logarithmical) data, such data regions (speech pauses or silence and extreme loudness) being considered unreliable as well as of limited significance. In the further utilization of such logarithmic data of FIG. 5B, it may be desired to incorporate curve filtering or data interpolation techniques in order to handle or conveniently process the occurrences of sample amplitudes for which there may be no corresponding address among the list of discrete addresses employed in ROM 14 in FIG. 2, for example, should better data resolution be required.

The shape of the histogram, d(x), of FIG. 3, generated and stored in element 15 in FIG. 2, is generally invariant with time or changes little for a given transmission channel of speech signals. In other words, the relative values of d(x) for each of different values of x would remain the same or vary slowly. However, it is to be appreciated that the actual value of d(x) generated and stored for each value of x would increase as the signalling interval or period (and associated data processing interval) progressed. Accordingly, means is also included in element 15 for normalization of the stored data, whereby the actual values (as well as relative values) remain within limits, so as to avoid exceeding the storage limits of the memory function, as is shown more particularly in FIG. 7.

Figure 7:
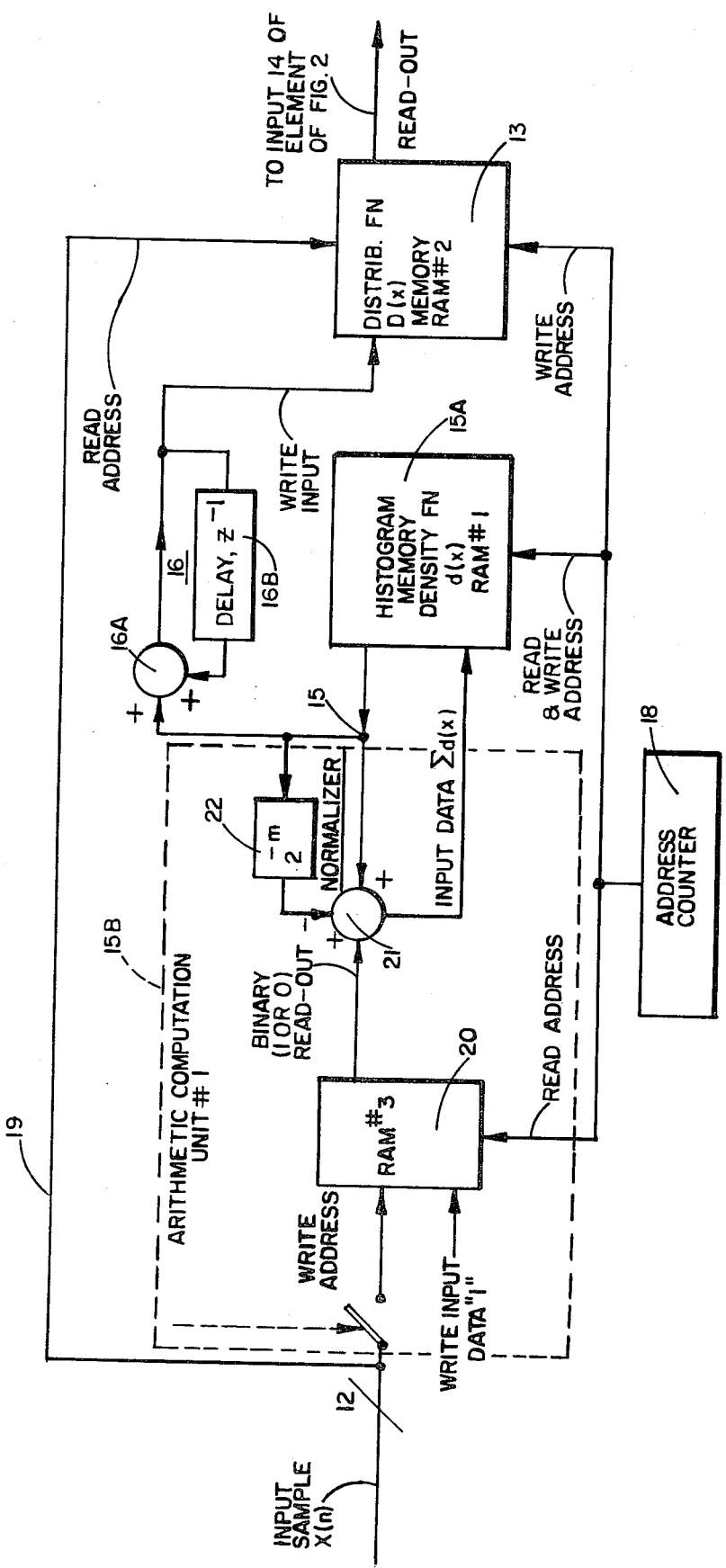
FIG. 7 is a block diagram illustrating in further detail the mechanization of that portion of the device of FIG. 2 for determination of the amplitude density function, $d(x)$, and amplitude distribution function, $D(x)$ for amplitude values of the sampled signal, $x(n)$.

Referring now to FIG. 7, there is shown in further detail the cooperation of the distribution function memory means with the amplitude density function storage means of FIG. 2, including the data normalization means therefor. There is shown an amplitude distribution funtion (D(x)) memory RAM 13, having a write-input responsive to the output of digital integrator 16 which, in turn, has an input responsive to the output of amplitude density function (d(x)) signalling means 15, all corresponding to the like referenced elements of FIG. 2. Integrator 16 may be mechanized as an accumulator comprised of a recirculating register with summer 16A and delay element 16B, as is well understood in the digital data processing art, whereby previously sampled digital values are stored and combined with a current digital value sample.

In normal operation of elements 13, 15 and 16 of FIG. 7 an address counter 18 provides an amplitude read-/write address to RAM 15A for storing at each address the number of times the amplitude corresponding to such address has been sampled, while the read addressing of element 15A by address counter 18 allows the stored value for the number of occurrences for a progressive sampled amplitude (x) to be fed from RAM 15A to digital summing element 16A of integrator 16, in the generation of the amplitude distribution function D(x). The output of address counter 18 also serves as a write address input to RAM 13 for the appropriate input addressing of the output integral $$\int_{-\infty}^{x} d(x)dx = D(x)$$

from integrator 16, applied as a write or data input to RAM 13. Thus, the data memory of RAM 13 is organized as D(x) versus x, in accordance with the discrete data curve of FIG. 4, whereby read-addressing of RAM 13 by the sampled input x(n) on input line 19 provides an output or read-out from RAM 13 of a value D(x) corresponding to the read-address amplitude, x(n).

It is to be appreciated that the cooperation of address counter 18 and integrator 16 with RAM's 13 and 15A is at a rate many times faster than the rate of read-addressing RAM 13 by the sampled amplitude x(n) input on line 19, in order to assure a complete or continuously updated D(x) memory in RAM 13 from which to effect a read-out.

Amplitude density function (d(x)) signalling means 15 in FIG. 7 is depicted as comprising block element 15A and dotted block 15B. Element 15A is a RAM having a read and write address, a data input responsive to a source (summer 21) of a value, d(x), corresponding to the number of times an addressed amplitude (x) has occurred. Dotted block 15B comprises a RAM 20 having a write address responsive to a digitally-coded sampled signal amplitude (x(n)), and also having a data input responsive to a binay "1" write signal, whereby such binary counting signal is stored or written-in at the amplitude (x(n)) address provided by the occurrence of an address input. The read-out of RAM 20 provides either a binary ("1" or "0") output or read-out in response to being periodically addressed for a read-out by address counter 18, a "0" output occurring for those amplitude addresses for which no corresponding amplitude has occurred since the last read address cycle. The binary read-out from RAM 20 for a given amplitude address is combined with the prior "score" $(d(x)_{old})$ from RAM 15A for such amplitude address, the arithmetic combination being effected by means of a summer 21, or like means well understood in the art. Such updated "score" or value $(d(x)_{new})$ for amplitude (x) is fed back for storage in RAM 15A at address, x.

Over a lengthy period of observation, the resultant large numbers of samples x(n) would result in a summation of scores $\Sigma d(x)$ which would exceed the capacity of RAM 15A, even though the relative weights among scores or amplitude density functions were unchanged for the various amplitude addresses. Accordingly, means for normalizing the data, as to be independent of the number of samples and as to be constrained to a number $\Sigma d(x)$ conveniently within the capacity of RAM 15A, is included in the arrangement of FIG. 7.

The normalization or limitation of the amplitude density function (d(x)) stored in memory 15A is effected by the inclusion of the element 22 in dotted block 15B. Such normalization or limitation refers to the maintenance of the curve or envelope of FIG. 3 for d(x) versus x at a given scale, or amplitude, regardless of the number of amplitude samples or occurrences sampled. In other words, the ordinate of "number of occurrences" is scaled as a relative number of occurrences, relative to that number of occurrences occurring for that amplitude having the maximum number of occurrences. Such limitation may be designated by a preselected number of occurrences for all sampled amplitudes of interest as represented by an initial condition inserted into RAM 15A and corresponding to the integral of the area under the curve of FIG. 4 for such initial condition (I.C.). Thus, $$\Sigma d(x)_{new} = \Sigma d(x)_{old} = \Sigma d(x)_{I.C.} = N. \tag{2}$$

In order that the scale of the curve of FIG. 4 not be increased or the memory capacity of RAM 15A exceeded by subsequent data inputs, the limitation is imposed that the addition of the next or new data sample ("1") to the old (scaled) data not exceed the number N:

$$1 + K_1 \Sigma d(x)_{old} = \Sigma d(x)_{new} = \Sigma d(x)_{old}. \tag{3}$$

In other words:

$$1 + K_1 N = N. \tag{4}$$

Solving for K in Equation (4):

$$K_1 = (N-1)/N = 1 - (1/N) < 1. \tag{5}$$

Now, where N represents some convenient number less than the memory capacity of, say, a 4096 or $2^{12}$ bit memory, then:

$$(1/N) = 2^{-m}, \tag{6}$$

where m = a convenient value equal to or less than 12.

Such scale factor, $K_1 < 1$, may be conveniently effected or mechanized (in attenuation of the stored data, $\Sigma d(x)_{old}$) by the inclusion of a shift register for down-shifting such data by the amount, $2^{-m}$, and then subtracting such attenuated value from such stored value, $\Sigma d(x)_{old}$. Such mechanization is achieved in the arrangement of FIG. 7 by the inclusion of a shift register 22 having an input responsively coupled to the read-out of RAM 15A and further having an output subtractively combined at an input to combining means 21. Thus, the scaling arrangement for dotted element 15B in FIG. 7 attenuates the stored density function data, $\Sigma d(x)_{old}$, in the generation of the updated data:

$$\Sigma d(x)_{new} = 1 + K_1 \Sigma d(x)_{old} \tag{7}$$

Figure 9:
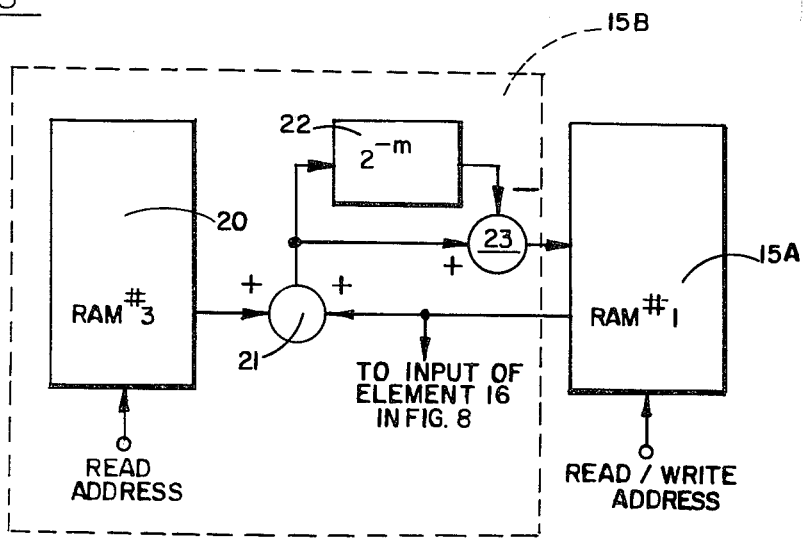
FIG. 9 is a block diagram form of an alternative embodiment of the normalizer and first arithmetic unit of FIGS. 7 and 8.

The scaling of the amplitude density function data is not limited to such specific mechanization, however, and alternate embodiments may be employed, such as the arrangement illustrated in FIG. 9.

Referring now to FIG. 9, there is illustrated an alternate mechanization for the scaling of the amplitude density function (d(x)) data of RAM 15A in which the combination of update sample occurrence ("1") and old data, $\Sigma d(x)_{old}$, are attenuated by coupling the input of the shift register 22 to the output of combining means 21, and interposing subtractive combining means 23 at the data input of RAM 15A, to subtractively combine the output of element 22 with the output of element 21:

$$K_2[1 + \Sigma d(x)_{old}] = \Sigma d(x)_{new} \tag{8}$$

$$K_2[1 + N] = N \tag{9}$$

$$K_2 = N/(1+N) = [(N+1)-1]/(1+N) = 1 - 1/(1+N). \tag{10}$$

Thus,
$$1/(1+N) = 2^{-m} \quad (11)$$

for the embodiment of FIG. 9 as distinguished from the case of $(1/N)=2^{-m}$ for $K_1$ in the embodiment of FIG. 7.

In the generation of the amplitude density function d(x) illustrated in FIG. 3, it is to be appreciated that a general reference or order of magnitude voice intensity or volume is required. If, for example, the voice signal of interest were to increase in gain or volume, the incoming data in FIG. 3 would be shifted or biased to the right, as illustrated. If, however, the voice signal of interest were subject to period fading, then the data would periodically shift to the left, corresponding to generally lower amplitude levels. Accordingly, well-known automatic gain control means may be inserted between the output of the signal receiver and the input to the data mapping device 11 in FIG. 1. Where such changes in signal strength are not due to periodic signal fading, but due to speech habits of the speaker, it may be desirable to use the AGC control of the input AGC to inversely control an output inverse AGC (at the output of data mapping means 11 in FIG. 1) to recover or preserve such characteristic of the speech signal of interest. In any event, the details of such AGC mechanization do not constitute a novel feature of the invention, it being desirable, however, that such AGC system have a first order time constant or response time on the order of the interval of about $2^{16}$ data samples of the disclosed digital processor.

Figure 8:
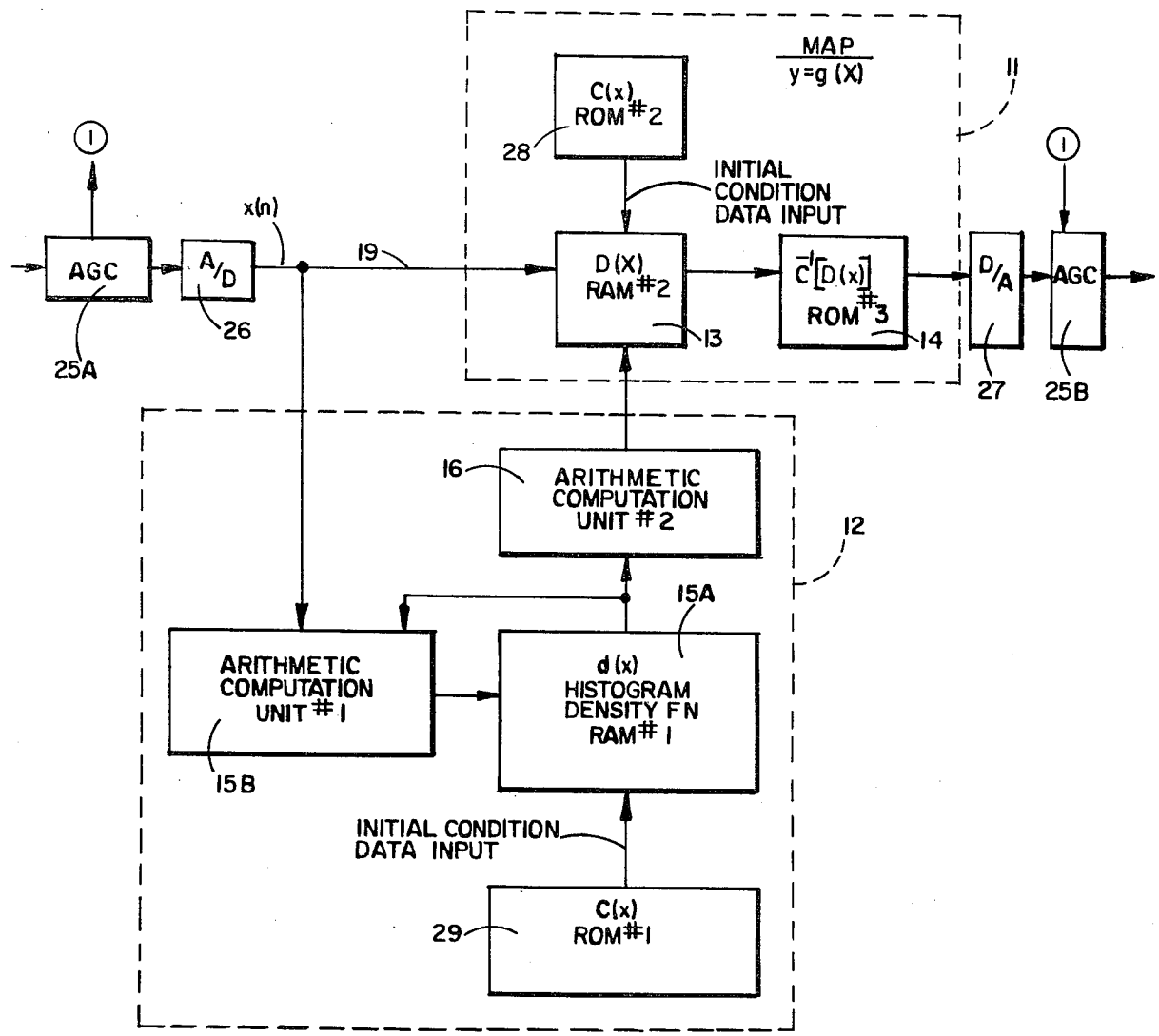
FIG. 8 is a block diagram, illustrating other details of the system of FIG. 2.

Such AGC, A/D and D/A elements are shown schematically in block form in the system block diagram of FIG. 8 as elements 25A and B, 26 and 27, respectively, the construction and arrangement of such elements being well-known to those skilled in the art. A/D element 26 may include an anti-aliasing filter in accordance with the well-known Nyquist criterion, in order to avoid adverse system response to the sampling rate, while D/A element 27 may also include a reconstruction filter for like reasons.

Also shown in FIG. 8 are data mapping element 11 (comprised of RAM 13 and ROM 14) and updating means 12 (comprising RAM 15A arithmetic computation unit 15B and integrator 16) corresponding to the like referenced elements of FIG. 7. In addition, respective initial condition ROM's 28 and 29 have been included in elements 11 and 12, ROM 28 providing an initial condition input to the distribution function RAM 13 and ROM 29 providing an initial condition input to the density function RAM 15A, such initial condition inputs having been explained above in connection with the description of FIG. 2.

Figure 6:
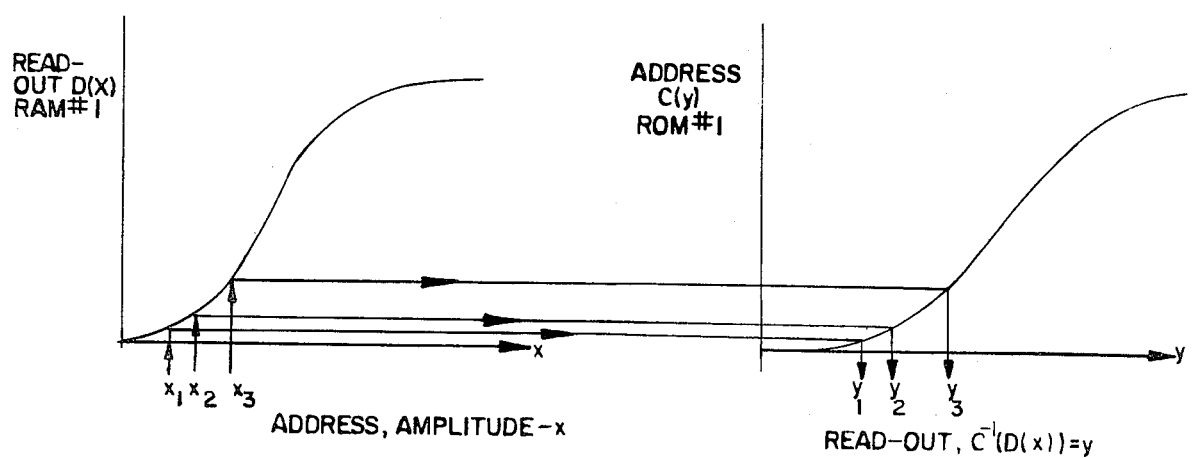
FIG. 6 illustrates the two-step technique of the invention for implementing the data mapping concept, $y = g(x)$, of FIG. 1, whereby the value of the amplitude distribution function $D(x)$, obtained for the address (x), becomes the address for the inverse function, $C^{-1}[D(x)]$.

Accordingly, there has been described a method and apparatus for compensation or equalization of non-linear amplitude distortions. Such equalization technique employs a histogram d(x) to establish an amplitude map, y=g(x), by which the amplitude (x) of each data sample (or signal amplitude sample) is mapped into a new output amplitude (y) representing such sample, as illustrated in FIG. 6. In the particular method disclosed, the histogram is employed to generate a distribution function D(x) of the sampled amplitude. The map is computed from the distribution function D(x) for the sampled amplitude (x) and the distribution function C(y) for a reference model. C(y) is a single valued monotonic function (i.e., the first derivative of the function is everywhere of a fixed sense or sign). Thus, the corrected output y may be defined from the inverse function, $y = C^{-1}[C(y)]$. Ideally the functions D(x) and C(y) are identical; therefore, such definition for y is equivalent to looking up $C^{-1}[D(x)] = g(x)$. Such method is a two-step mapping procedure, the effectiveness of which is limited by the validity of the statistical model, C(y).

Such means for compensation of non-linear distortion may be combined in tandem with linear compensation means, such as that disclosed in the above-noted U.S. Pat. No. 4,000,369 to James E. Paul, Jr., to effect compensation of both linear and non-linear distortions. Where the primary causes of such distortion forms may be identified or treated as several lumped sources of alternatively linear and non-linear distortions, then a tandem arrangement of a corresponding number of sets of linear and non-linear compensation may be used, as shown in FIG. 10.

Figure 10:
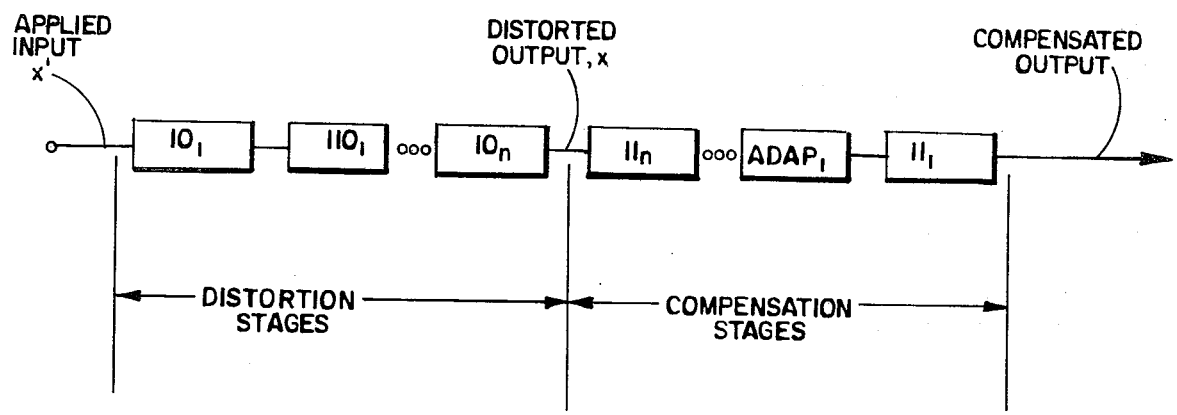
FIG. 10 is a block diagram of a signalling system in which the non-linear compensation concept of the subject invention may be advantageously combined with linear compensation.

Referring to FIG. 10, there is schematically illustrated a signalling system in which the non-linear compensation concept of the invention may be advantageously combined with linear compensation. A representative signalling channel is depicted as characterized, for example, of a first non-linear distortion section $10_1$, a subsequent linear distortion section $110_1$ and a further non-linear distortion section $10_n$, such sections cooperating in tandem as illustrated. A signal response occurring at the output of element 10n in consequence of an input signal applied to an input of element $10_1$ will thus be distorted in an amount representing the contributions of those elements $10_1$, $110_1$ and $10_n$.

Compensation of the output signal from element 10n, to restore the content of the applied input signal to element $10_1$ requires that tandem compensation be applied in the reverse sequence in which the distortion sequence occurred, a non-linear distortion compensator 11n responsive to the distorted output signal (from element 10n) being first inserted in order to correct the non-linear distortion contributed by element 10n. Element 11n is then followed in tandem by a linear compensation $ADAP_1$ by which the signal is corrected for the distortion contributed by linear distortion element $110_1$. Element $ADAP_1$, in turn, is followed in tandem by another non-linear distortion compensator $11_1$ which serves to remove the distortion contributed by non-linear distortion element $10_1$. In other words, the compensation elements are ganged to remove or peel back the contributory distortions in the reverse order in which such distortions occurred.

Accordingly, there has been disclosed novel means for advantageously compensating for non-linear distortion effects in a signalling system. Although the concept of the invention has been discussed in terms of its application to speech or voice-coded signals, the concept is not so limited and may be applied to any class of signal capable of being reasonably described by a histogram.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A signalling system comprising in combination,
   a signalling channel having non-linear amplitude distortion characteristics; and
   non-linear distortion compensation means in which a compensated output signal amplitude sample is provided in response to a sampled signal amplitude input from said signalling channel as a function of the amplitude density function of the input signal history.

2. A device for the correction of signal distortion occurring in a signalling channel, and comprising:
signal sampling means adapted to be responsive to an applied signal input (x) as a write-address for generating a statistical amplitude distribution function D(x); and
inverse distribution function means responsive to addressing by the distribution function output of said signal sampling means for providing an output signal, y, corresponding to a compensatorily modified amplitude of the applied signal input (x).

3. The device of claim 2 in which said inverse distribution function means includes addressable memory means for storing discrete output signal amplitude values as an a priori function of the read-address.

4. The device of claim 2 in which said signal sampling means comprises:
means responsive to said write-address for generating an amplitude density function, d(x), representing the number of occurrences of an amplitude of the sampled input, (x); and
integrating means responsive to the output of said means for generating d(x) for providing an output D(x) indicative of the integral of d(x) with respect to x and comprising a cumulative register.

5. The device of claim 4 in which there is included means for normalizing the amplitude density function as to be independent of the size of the sampled population of the sampled signal (x).

6. A device for the compensatory adjustment of a sampled signal in accordance with the statistical deviation thereof from a preselected statistical model and comprising:
an address counter;
a first random access memory having a write-input responsive to the cumulative number of occurrences of each of a plurality of preselected amplitude samples for the sampled signal, and a read-/write address input responsive to an output of said address counter for providing an output indicative of an amplitude density function (d(x)) for the sampled digital input, (x);
a second random access memory having a write-input responsive to the integral of the output of said first random access memory with respect to the amplitude of the sampled digital input (x), a write-address input responsively coupled to said output of said address counter, and a read address responsive to said sampled digital input (x) for providing a read-output indicative of an amplitude distribution function, D(X); and
a read only memory corresponding to an arbitrary inverse function generator, having an address input responsive to said read-output of said second random-access memory for providing an output corresponding to a compensatorily-adjusted, sampled input signal, (x).

7. The device of claim 6 in which there is further provided means for establishing an initial stored signal condition in each of said first and second random access memories and comprising:
a second read-only memory having a preselected amplitude density function stored therein in accordance with a priori statistical model of the amplitude density function, a read output of said second read-only memory being coupled to a write input of said first random access memory, and
a third read-only memory having a preselected amplitude distribution function stored therein in accordance with an a priori statistical model of the amplitude distribution function, a read output of said third read-only memory being coupled to a write-input of said second random access memory.

8. The device of claim 6 in which there is provided scaling means for continuously adjusting the scaling of the write-inputs to the first random-access memory, so as to avoid exceeding the limits of said first random-access memory and comprising digital means for preselectively attenuating the write-input to said first random access memory.

9. A device for the correction of signal distortion occurring in a signalling channel and comprising:
an address counter for preselected successive discrete values of a sampled signal amplitude,
a first random access memory having a "1" write-input, a write-address responsive to the digitized value of the applied input (x), and a read address responsively coupled to an output of said address counter;
a second random access memory having a write-input, a read-output and a read/write address input responsive to said output of said address counter;
digital arithmetic combining means responsive to said read-outputs of said first and second random access memories, for providing an output indicative of an amplitude density function (d(x)) for the sampled digital input, (x);
digital integrating means having an input responsive to the output d(x) of said second random access memory means for providing an output D(x) indicative of the integral of the input thereto and corresponding to an amplitude distribution function, D(x);
a third random access memory having a write-input responsive to the output of said digital integrating means, a write-address input responsively coupled to said output of said address counter, and a read address responsive to said sampled digital input (x) for providing a read-output indicative of said amplitude distribution function D(x);
a read only memory corresponding to an arbitrary inverse function generator, having an address input responsive to said read-output of said third random access memory for providing an output corresponding to a compensatorily-adjusted, sampled input signal (x).

10. The device of claim 9 in which there is provided a scaler responsively coupled to said read-out of said second random access memory and subtractively coupled to said digital arithmetic combining means for attenuating the output thereof.

11. The device of claim 9 in which there is provided:
scaling means for continuously adjusting the scaling of the write-inputs to the second random access memory, so as to avoid exceeding the limits of said second random access memory; and
comprising a digital means for preselectively attenuating the write-input to said second random access memory.

12. A device for the compensatory adjustment of a sampled signal in accordance with the statistical deviation thereof from a preselected statistical model and comprising:

an address counter for preselected successive discrete values of the sampled signal amplitude;

a first random-access memory having write-input and a read/write address input responsive to an output of said address counter;

a second random access memory having a write-input, a write-address input responsively coupled to said output of said address counter, and a read address responsive to said sampled digital input (x);

a read only memory corresponding to an arbitrary inverse function generator, having an address input responsive to said read-output of said second random-access memory for providing an output corresponding to a compensatorily-adjusted, sampled input signal (x);

first arithmetic means cooperating with said address counter and the read-out of said first random access memory and interposed at a write-input of said first random access memory for providing an input thereto corresponding to the cumulative number of occurrences of each of a plurality of preselected amplitudes of the sampled input signal; and second arithmetic means cooperating with said address counter and the read-out of said first random access memory and interposed at a write-input of said second random access memory for providing an input thereto corresponding to the cumulative number of occurrences of amplitudes equal to or less than each addressed amplitude.

13. The device of claim 12 in which said first arithmetic means includes digital means for preselectively attenuating the write-input to said first random access memory so as to avoid exceeding the limits of said first random-access memory.

14. The device of claim 12 in which there is further provided means for establishing an initial stored signal condition in each of said first and second random-access memories and comprising:

a first read-only memory having a preselected amplitude density function stored therein in accordance with a priori statistical model of the amplitude-density function, a read output of said first read-only memory being coupled to a write input of said first random access memory, and a second read-only memory having a preselected amplitude distribution function stored therein in accordance with an a priori statistical model of the amplitude distribution function, a read output of said second read-only memory being coupled to a write-input of said second random access memory.

* * * * *

UNITED STATES PATENT AND TRADEMARK OFFICE
CERTIFICATE OF CORRECTION

PATENT NO.   : 4,315,319
DATED        : February 9, 1982
INVENTOR(S)  : Visvaldis A. Vitols and Stanley A. White It is certified that error appears in the above-identified patent and that said Letters Patent are hereby corrected as shown below:

Page 1, [75] Inventor:, correct "Stanley A. White, Santa Ana, Calif." to read ---Visvaldis A. Vitols, Orange and Stanley A. White, Santa Ana, both of Calif.---.

Signed and Sealed this

Thirteenth Day of April 1982

[SEAL]

*Attest:*

*Attesting Officer*

GERALD J. MOSSINGHOFF

*Commissioner of Patents and Trademarks*